United States Patent [19]
Rao et al.

[11] 3,882,725
[45] May 13, 1975

[54] TEMPERATURE MEASURING APPARATUS AND METHOD WITH RESISTANCE AMPLIFIER

[75] Inventors: Dhulipala M. Rao, Penn Hills; James F. Sutherland, Pittsburgh, both of Pa.

[73] Assignee: Westinghouse Electric Corporation, Pittsburgh, Pa.

[22] Filed: July 5, 1972

[21] Appl. No.: 268,952

[52] U.S. Cl............. 73/342; 73/362 AR; 307/310; 323/75 N
[51] Int. Cl........................... G01k 7/20; G05f 1/46
[58] Field of Search.............. 73/342, 360, 362 AR, 73/362 SC; 307/310; 323/75 E, 75 F, 323/75 H, 75 N, 40

[56] References Cited
UNITED STATES PATENTS

| | | |
|---|---|---|
| 3,379,973 | 4/1968 | Walton...................... 73/362 AR X |
| 3,421,375 | 1/1969 | Dimon....................... 323/75 H UX |
| 3,485,102 | 12/1964 | Glick................................. 73/342 X |
| 3,715,922 | 2/1973 | Menge........................... 323/75 E X |

Primary Examiner—Richard C. Queisser
Assistant Examiner—Frederick Shoon
Attorney, Agent, or Firm—E. F. Possessky

[57] ABSTRACT

Apparatus for operating a bridge network incorporating a resistance temperature detector (RTD) in the null balance configuration. The bridge is balanced by applying a feedback signal from a first operational amplifier connected across the bridge outputs, to a second operational amplifier connected in series with the RTD in one leg of the bridge. The isolation provided by the operational amplifiers permits non-interacting suppression adjustment in the bridge and span adjustments in the output circuit of the first operational amplifier.

12 Claims, 2 Drawing Figures

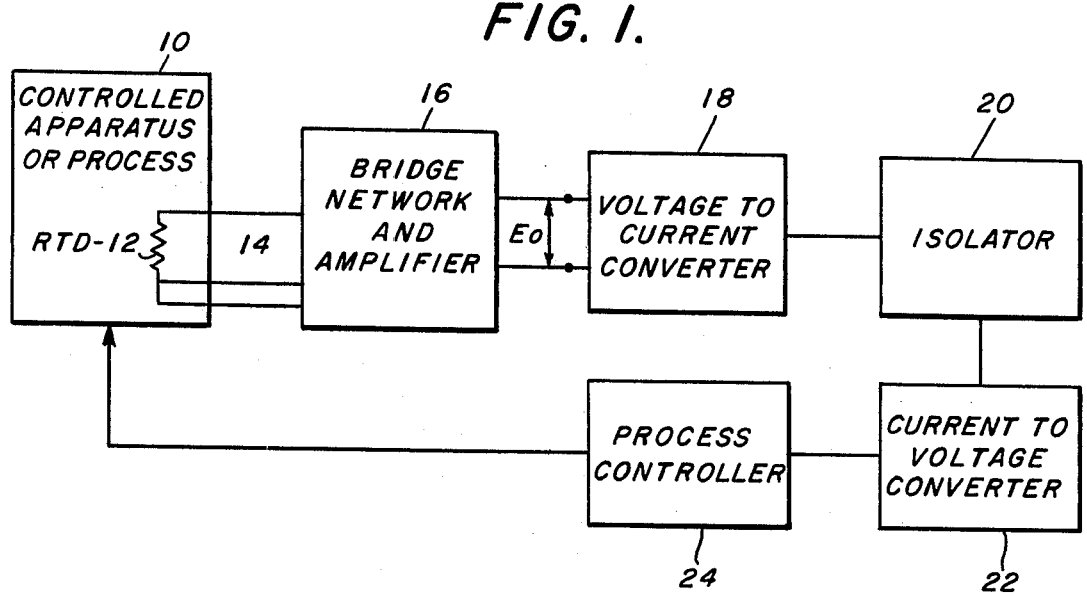
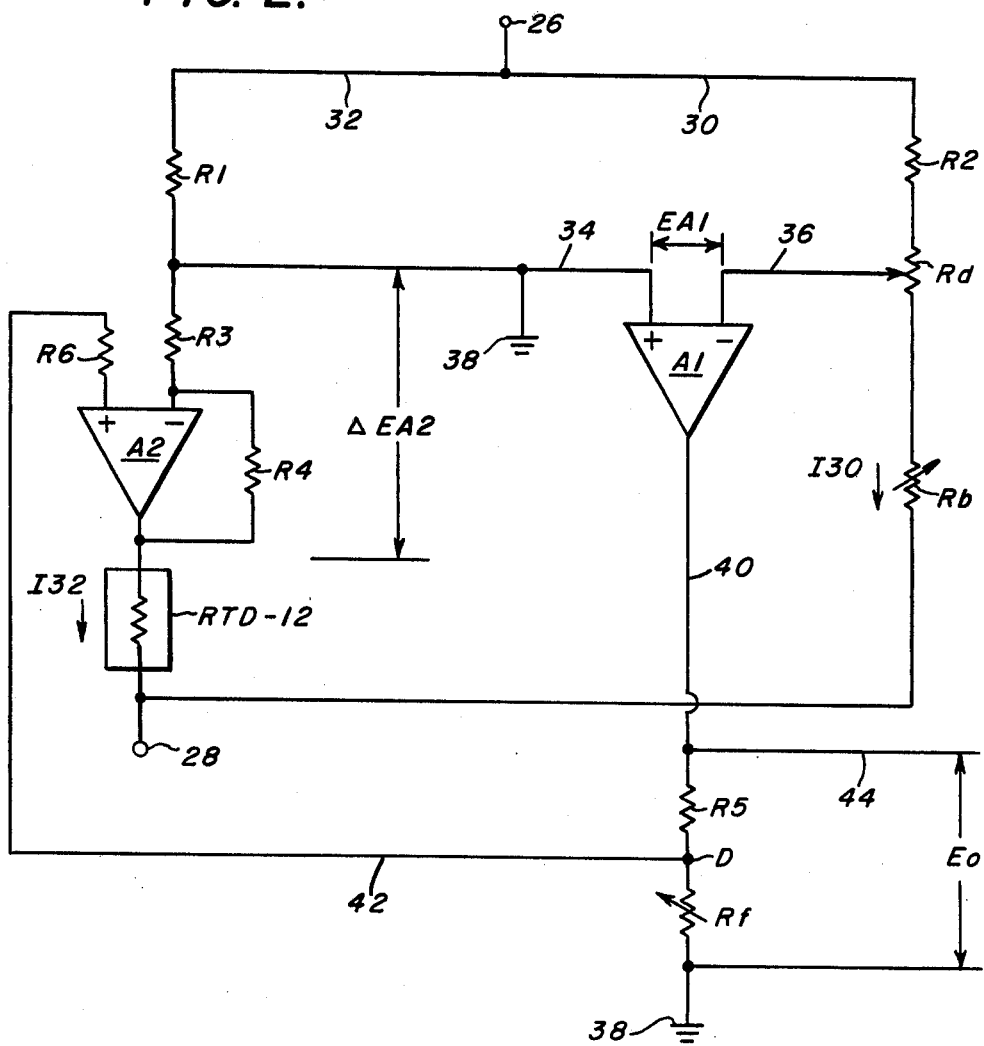

TEMPERATURE MEASURING APPARATUS AND METHOD WITH RESISTANCE AMPLIFIER

BACKGROUND OF THE INVENTION

1. Field of the Invention

This invention relates to resistance temperature detector instrumentation and, more particularly, to such instrumentation employing bridge networks operated in the null balance configuration.

2. State of the Prior Art

The conventional resistance temperature detector element is widely used in the process control industry for monitoring various parameters of the system. The detector element generally comprises a wire wound resistance mounted in what is termed a bulb. The wire is generally copper, nickel, or platinum, and the resistance of the element is very accurately known. The detector element is field mounted in the system under consideration, for example a plurality of detector elements are positioned proximate to heat transfer medium, such as the heated water employed in nuclear reactor systems. The detector elements can monitor the temperature changed in the system.

The resistance temperature detector element is adapted to be connected in a resistance bridge network, which can be field mounted, or mounted within the control room of the facility. When such detector elements are filed mounted remote from the bridge network, it is conventional to utilize a three or four wire connection from the element to the bridge network, to provide compensation for the change in connecting lead resistance that may be present due to ambient temperature changes. The operation of such resistance bridge networks is well known, and typically they are connected in a null balance configuration with an indicating galvanometer or other such indicator connected across the current branches of the bridge network, with the output signal being a null signal when the current branches are balanced. A variable balancing impedance is included in one of the current branches and the detector element in the other current branch. It is desirable to calibrate or balance the network at some initial temperature which the resistance temperature detector element is sensing and to adjust the balancing resistor to provide a null signal output at this initial temperature.

The operational amplifier has been finding wide application in control systems, and such amplifiers are explained in detail in "Operation Amplifiers" Edited by Tobey, Graeme, and Huelsman, a McGraw-Hill publication. An operational amplifier exhibits a high effective input impedance and a low substantially constant effective output impedance. In the ideal case the input impedance is infinite and the output impedance is zero.

The use of such an operational amplifier in combination with a resistance bridge network including a remotely mounted resistance temperature detector element is shown in U.S. Pat. No. 3,503,261, issued Mar. 31, 1970. A feedback resistor is connected in the output line of the operational amplifier in this prior art teaching. The output voltage of the bridge circuit is fed into the input of the amplifier in series opposition with a feedback voltage derived from the output thereof to minimize the effect of bridge non-linearity. The feedback resistor was thus serially connected with either the sensing element or the balancing resistor as a part of one of the current branches of the bridge network. Thus, the impedance value of the balancing resistor and the feedback resistor are objectionably interrelated.

In control systems application it is desirable to generate an electrical signal which is proportional to the process parameter change, i.e., here the temperature change, and to limit the output signal range to correspond to a temperature range under consideration. The feedback resistance value can thus be conveniently varied to insure that there is a correspondence between the output signal range and the temperature signal range.

In complex processes or systems numerous resistance temperature detector elements are field mounted and connectable to the bridge network disposed in the control room, and depending upon the criticality of the temperature measurement redundant detector elements may be used. In such applications where individual detector elements are being sequentially connected to the bridge network, and where various detector elements are being used to observe different temperature ranges it becomes very important to be able to independently adjust the bridge network balancing resistor and the feedback resistor.

SUMMARY OF THE INVENTION

An apparatus for generating an electrical signal as a function of a resistance change of a resistance temperature detector element. The apparatus comprises a resistance bridge network having its inputs connected to a constant current source, with a resistance temperature detector element connected in one leg of the bridge network. A variable resistance is connected in another leg of the bridge network, and is operative to balance the bridge network for a predetermined condition of the detector element. A first operational amplifier has its input terminals connected to the output terminals of the bridge network. The output of the first operational amplifier is connected via a feedback loop to the bridge network. A second operational amplifier is included in the feedback loop with the non-inverting input terminal connected to the output of the first amplifier, and the other input terminal and the second amplifier output terminal being serially connected with the detector element in one leg of the bridge network. The second amplifier functions as an incremental voltage generator, with the incremental voltage corresponding to a value needed to balance the bridge network at a changed resistance value of the detector element. A null signal is applied to the inputs of the first amplifier at bridge balance and the first amplifier exhibits a null output signal at balance. The electrical signal which is generated at the output of the first amplifier can be applied to an indicator or to a control system for controlling the process or apparatus which the detector element is monitoring.

The apparatus is particularly useful in that the span of the generated electrical signal can be controlled and varied by means of a feedback resistance connected in the output line of the first amplifier, and the feedback resistance and signal span can be readily varied without affecting the balance of the bridge network because the second amplifier functions as an isolating incremental voltage generator. The isolation provided by the operational amplifier permits non-interacting suppression adjustment in the bridge and span adjustment in the output circuit of the first amplifier.

A preferred method of operating a bridge network which permits non-interacting suppression and span adjustment is detailed.

BRIEF DESCRIPTION OF THE DRAWINGS

FIG. 1 is a schematic diagram of a system utilizing the present invention.

FIG. 2 is a simplifier schematic circuit diagram of an embodiment of the present invention.

The invention can be best understood by reference to the exemplary embodiment shown in the drawings.

In FIG. 1, a controlled apparatus or process system 10, such as a nuclear reactor vessel filled with moderator fluid, has a resistance temperature detector (RTD) element 12 disposed proximate thereto to indicate the temperature of the fluid or of the vessel wall. The RTD element 12 is a conventional resistance wire bulb and has three-wire connection leads 14 connected thereto which extend to the remotely located control card 16, which can be termed a bridge network and amplifier card as seen in greater detail, but still in a simplified schematic circuit in FIG. 2.

The output signal generated by the bridge network and amplifier card 16 is preferably a voltage signal with a range of 0–10 V d.c. which can be transmitted to an indicator meter, not shown, or preferably to a voltage-to-current converter 18, and thence to an isolating apparatus 20, a current-to-voltage converter 22, and to a process control apparatus 24 which provides a feedback signal used to vary an element or a process parameter in the controlled apparatus 10.

The bridge network and amplifier card 16, shown in a simplified schematic circuit in FIG. 2, is adapted to be connected to a constant current d.c. power supply, not shown, at input terminal 26 and common terminal 28. One current branch 30 of the bridge network includes resistor R2, the resistance of balancing potentiometer Rd, and variable resistor Rb. The other current branch 32 of the bridge network includes resistor R1 which preferably is equal in value to R2, and a high effective input impedance, low effective output impedance operational amplifier A2 serially connected with the RTD element 12. Operational amplifier A1 has its input leads 34, 36 connected across the current branches 30, 32 of the bridge network below the resistors R1 and R2 in a null balance configuration, i.e., when the current branches are balanced there is a null input signal for A1. Amplifier A1 input lead 34 is connected to amplifier common 38 and current branch 32. The other A1 input lead 36 is connected to current branch 30 at balancing potentiometer Rd. The output lead 40 of amplifier A1 is serially connected via load resistor R5 and variable feedback resistor Rf to amplifier common 38. Feedback line 42 extends from point D between R5 and Rf to the non-inverting input of amplifier A2 with load resistor R6 in the line 42. A further output signal lead 44 is connected to lead 40 to transmit the output signal to an indicator or to a control system.

The operation of the signal generator of the present invention will be explained by reference to FIG. 2. It should be understood that in fact a plurality of distant RTD elements 12 can be sequentially switched into the bridge network. The balancing resistor Rb can be a selectively variable resistive network as can feedback resistor Rf.

The three wire lead connectors 14 are brought from the remotely disposed RTD element 12, with two leads being brought from one side of the RTD. The single lead side of the RTD is connected to the output of amplifier A2, while one of the two leads brought from the other side of the RTD is connected to bridge common 28, and the other lead is connected to variable balancing resistor Rb. This three-wire connection and the constant current operation of the network provide compensation for any change in connecting lead resistance due to ambient temperature changes along the path from the field mounted position to the control room where the bridge network is disposed. The three-wire connection also eliminates lead wire resistance effects which could be present from having the RTD elements mounted at various distances from the bridge network.

In operation, the bridge network is connected to a constant current power supply at inputs 26 and 28 to establish currents in branches 30 and 32. The network is balanced at some initial temperature, typically the lower limit of the temperature range under consideration by adjusting Rb and the slider on potentiometer Rd to effectively balance the resistance of the RTD 12.

When the temperature of the process or controlled apparatus is increased, the resistance of RTD 12 increases and the currents in branches 30 and 32 are unbalanced giving rise to an input signal EA1 across the inputs 34, 36 of amplifier A1. An amplifier A1 output signal is thereby generated which is a function of the temperature-resistance increase of RTD 12. The output signal appears across the voltage divider comprising resistor R5, and feedback resistor Rf. The value of Rf is originally selected to insure that the output signal of A1 is within a desired range, and preferably 0–10 V d.c. for the temperature range under consideration. Thus, the output signal span corresponds to the span of the resistance change of RTD 12 for the temperature range under consideration.

The resistor R5 and Rf act as a voltage divider, and since amplifier A2 exhibits a high effective input impedance, the voltage at point D is proportional to the output voltage of amplifier A1. A given resistance change for RTD 12 will require a given incremental output signal $\Delta EA2$ to restore the bridge to balance, irrespective of the output signal span. The value of Rf will determine the span of the output signal Eo which is transmitted to the indicating or control system.

A feedback signal is derived from the output signal of A1 and transmitted via feedback line 42 and load R6 to the non-inverting input of feedback amplifier A2. Amplifier A2 is an operational amplifier which exhibits low effective output impedance. The other input of A2 is connected to the bridge network so that A2 is effectively connected in current branch 32. An output signal or incremental potential $\Delta EA2$ is generated by amplifier A2 which is applied to the current branch to compensate for the increased potential drop across the RTD element. The effect of this output signal $\Delta EA2$ is to balance the current branches 30, 32 and drive the input signal EA1 to A1 to a null signal. The following equation had by summing the potentials around the loop in the lower portion of the network explains the operation of the network.

$$EA1 = \Delta EA2 - (I32\ RTD) + [I30(Rd + Rb)]$$

where the Rd in the equation relates to the resistive portion of Rd which the slider connects in the loop under consideration, and where EA1 is the input to the high-open-loop-gain amplifier A1, with EA1 equaling zero at balance. This equation illustrates that once the network is balanced for some initial input suppression resistance, that is, the resistance value of RTD 12 at an initial temparature, the only element in the network which is varied thereafter is RTD 12 resistance. The amplifier A2 effectively acts as an isolating element because of its high effective input impedance and low effective output impedance. The feedback resistor Rf can be varied to adjust the output signal span of A1 without influencing the active bridge network balance.

The resistors R3 and R4 which are connected to the inverting input of amplifier A2 can be readily adjusted to provide the desired low closed loop gain for amplifier A2; by way of example, R3 is about 1 kilohm and R4 is 200 ohms. Also by way of example, the effective input impedance of amplifier A2 is of the order of 2 megohms, and the substantially constant output impedance is of the order of 1 milliohm.

The present apparatus permits initial balancing of a bridge network for each of a plurality of field mounted RTD elements which can have widely varying initial resistance values. The bridge network can be associated with operative switching means for sequentially connecting individual RTD elements to the network for monitoring the process or controlled apparatus. The variable balancing resistor Rb and feedback resistor Rf can comprise resistive networks with operative switching means for connecting a predetermined resistive value to the network depending upon which RTD element is connected to the network and which temperature regime is under consideration.

The voltage-to-current stage 18, isolating stage 20, and the current-to-voltage stage 22, are utilized to provide an isolated signal to the control system which effects adjustment of a valve or other such apparatus to adjust the process parameters of the controlled process.

The resistance temperature detector elements utilized exhibit a generally linear resistance-temperature characteristic within given temperature ranges, and, if the detector element is to be used in a range in which the resistance-temperature characteristic is non-linear, a signal characterizer system can be adapted to the system of the present invention to provide a linear output signal throughout the temperature range, with appropriate break-points which define the limits of a linear resistance-temperature regime.

A filtering network can also be connected across the inputs of amplifier A1 to filter the bridge signal eliminating transient signals. A diode network can also be connected across the intputs of amplifier A1 to limit the input signal level to A1. A capacitor can be shunted across amplifier A1, as is well known, to prevent saturation of the amplifier output signal.

What is claimed is:

1. Apparatus for generating a signal as a function of the resistance change of a resistance temperature detector element comprising:
   a. a resistance bridge network having its inputs connected to a constant current source;
   b. a resistance temperature detector element connected in one leg of the bridge;
   c. a first operational amplifier connected across the outputs of said bridge to generate an output signal;
   d. a second operational amplifier having one input terminal and its output terminal connected in series with the resistance temperature detector element in said one leg of said bridge, and
   e. means for applying a feedback signal derived from the output of said first operation amplifier to the other input of said second operational amplifier whereby the second operational amplifier will balance the bridge by adding an incremental potential to said one leg to compensate for any potential change in said leg caused by a change in the resistance of said resistance temperature detector.

2. The apparatus of claim 1 including a variable resistance connected in another leg of the bridge network operative to balance the bridge network to generate zero potential at the output of said first operational amplifier for a predetermined base temperature condition of the resistance temperature detector.

3. The apparatus of claim 2 wherein the means for deriving the feedback signal includes a voltage divider having a first resistance portion and a second resistance portion connected between the output of the first operational amplifier and ground, and a voltage intermediate said first and second portions of the voltage divider for extracting the feedback signal.

4. The apparatus of claim 3 including span adjusting means for varying the total effective resistance of the two resistance portions of the voltage divider.

5. The apparatus of claim 4 wherein the span adjusting means includes means for varying the effective resistance of one of the resistance portions of said voltage divider.

6. The apparatus of claim 5 wherein the said feedback signal is applied to the non-inverting input of said second operational amplifier and wherein a feedback resistor is connected between the output and the inverting input of said second operational amplifier.

7. The apparatus of claim 1, including means for selectively connecting a particular remotely disposed resistance temperature detector element into said one leg of the bridge network, and for sequentially connecting others of a plurality of remotely disposed resistance temperature detector elements into the bridge network.

8. The apparatus of claim 1 wherein a three wire lead connection is used to connect a remotely disposed detector element to the bridge network.

9. Apparatus for generating a signal as a function of the resistance temperature detector element comprising:
   a. a resistance bridge network having its inputs connected to a constant current source;
   b. a resistance temperature detector element connected in one leg of the bridge;
   c. a first operational amplifier having its non-inverting input connected to a first bridge output connected to said one leg containing the resistance temperature detector element and to an amplifier ground and having its inverting input connected to the other output of the bridge, said first operational amplifier being operated in the feed back mode wherein said first operational amplifier assumes an output voltage which drives the potential on the inverting input to virtual ground;
   d. a voltage divider connected between the output of the operational amplifier and amplifier ground for generating an output signal thereacross;

e. a feedback loop for said first operational amplifier including a second operational amplifier connected in series with the resistance temperature detector element in said one leg of the bridge with its inverting input connected to said first bridge output, its non-inverting input connected to a tap of the voltage divider and its output connected to the resistance temperature detector, said second operational amplifier also having a feedback resistor connected between its output terminal and its inverting input, whereby the second operational amplifier will balance the bridge by adding an incremental potential to said one leg to compensate for any potential change in said leg caused by a change in the resistance of said resistance temperature detector.

10. The apparatus of claim 9 including a variable resistance connected in another leg of the bridge network operative to balance the bridge network to generate zero potential at the output of said first operational amplifier for a predetermined base temperature condition of the resistance temperature detector, and means for varying the effective resistance of one portion of said voltage divider to vary the magnitude of the output signal for any given temperature condition of the resistance temperature detector element whereby the bridge network is provided with independent span and suppression controls.

11. A method of null balance operation of a d-c bridge network having a resistance temperature detector element in one leg and an operational amplifier connected across the bridge outputs including the steps of:

a. varying the impedance in the output circuit of the operational amplifier to vary the span of the output signal generated by the operational amplifier;

b. generating a d-c feedback voltage proportional to the output signal generated by the operational amplifier; and c. generating an incremental d-c voltage proportional to the feedback voltage and adding said incremental d-c voltage to the d-c voltage developed by the resistance temperature detector element in said one leg to maintain said bridge in balance without affecting the load impedance in said one leg regardless of the selected impedance in the output circuit of the operational amplifier.

12. The method of claim 11 including the step of varying the load impedance in a second leg of said bridge network to balance the d-c bridge network to generate zero potential at the output of said operational amplifier for a predetermined base temperature condition of the resistance temperature detector.

* * * * *